March 15, 1966   F. W. SCHADE ETAL   3,241,024
CONTROLLED RECTIFIER MOTOR SPEED CONTROL SYSTEM
Filed Jan. 10, 1963   2 Sheets-Sheet 1
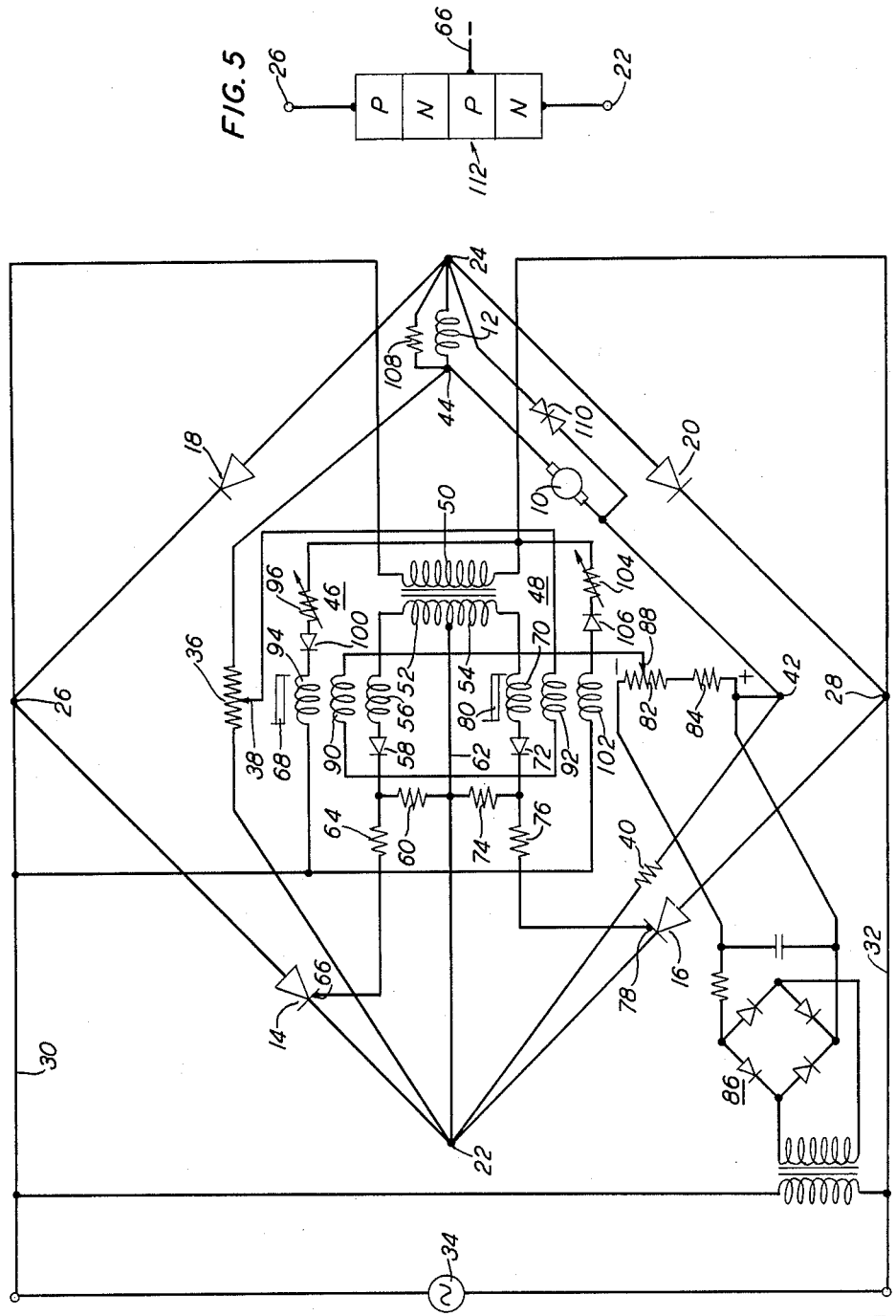
INVENTORS
FRANK W. SCHADE
PHILIP F. BEISCHER
BY John W. Gaines
ATTORNEY March 15, 1966   F. W. SCHADE ET AL   3,241,024
CONTROLLED RECTIFIER MOTOR SPEED CONTROL SYSTEM
Filed Jan. 10, 1963   2 Sheets-Sheet 2
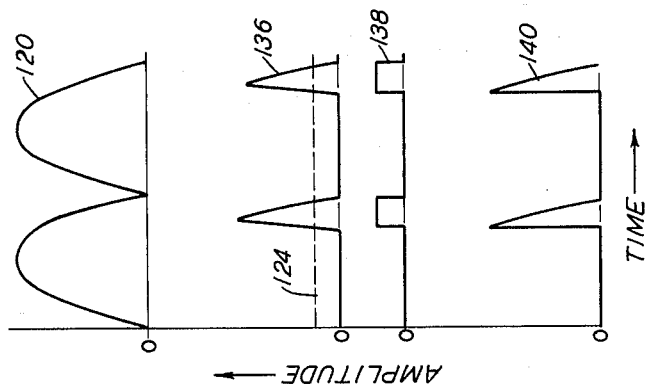
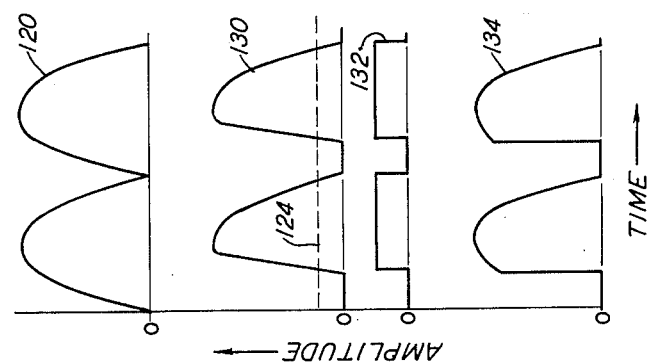
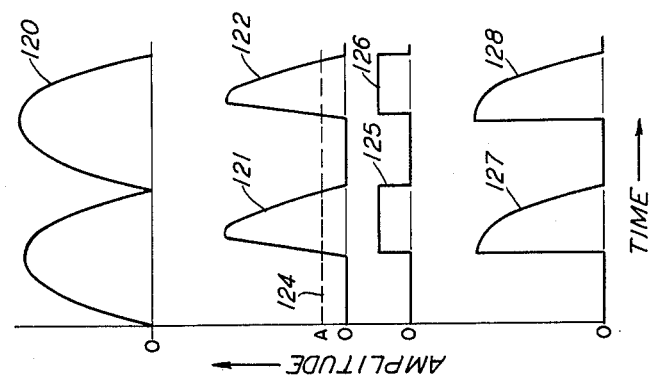
INVENTORS FRANK W. SCHADE
PHILIP F. BEISCHER
BY John W. Gaines
ATTORNEY

United States Patent Office 3,241,024
Patented Mar. 15, 1966

3,241,024
CONTROLLED RECTIFIER MOTOR SPEED
CONTROL SYSTEM
Frank W. Schade, Berkeley Heights, and Philip F. Beischer, Belleville, N.J., assignors to Air Reduction Company, Incorporated, New York, N.Y., a corporation of New York
Filed Jan. 10, 1963, Ser. No. 250,602
7 Claims. (Cl. 318—331)

This invention relates to motor control systems and more particularly to systems for maintaining substantially constant motor speed under varying loads.

In the system of the invention, departures from desired speed are reflected in changes in a voltage derived from the armature of the motor to be controlled. The voltage so derived is compared with a standard reference voltage and the difference between these voltages is used as a voltage feedback signal or control voltage for a translating device actuated by an alternating current source. The function of the translating device, which may be a magnetic amplifier, is to convert between the amplitude of the control voltage and the time phase of the beginning of an output pulse from the translating device, by a process in which the amplitude of the control voltage determines the time in the alternating current cycle at which the magnetic amplifier first becomes conductive. The output pulse ends when the output wave from the magnetic amplifier reverses phase and the current is cut off by the rectifier which is part of the magnetic amplifier. The output of the magnetic amplifier is connected to the gating terminal of a phase sensitive triggering device which latter device fires as soon as the output wave from the magnetic amplifier has built up a small voltage, for example about one volt. The triggering device is located in a rectifying bridge network which serves to supply pulsed direct current from the above mentioned alternating current source to the motor under the control of the triggering device. The triggering device remains conductive from the instant of firing until the alternating current supply reverses phase at the end of the half cycle of alternation. The direct current pulse is of the proper time duration to supply the motor with the power required to run the motor at the desired constant speed. Any change in the control voltage, due to varying load which may slow down or speed up the motor or due to whatever cause, will result in a compensatory change in the length of the power pulse so as to increase or decrease the power supply to the motor and maintain the motor speed substantially constant.

An object of the invention is to simplify the speed control of direct current motors, or universal motors.

Another object is to increase the efficiency of motor speed control systems.

Another object is to increase the reliability of such speed control systems.

A feature of the invention is a combination of a magnetic amplifier as a converter between motor speed and pulse duration of pulsed direct current power supply, together with a highly sensitive triggering device for determining the precise length of the pulse duration.

Another feature is the use of a double bridge network for feeding power to the motor and controlling the motor speed.

Another feature is a simple adjustment for setting the desired constant speed.

Another feature is apparatus and a method for calibrating the speed setting.

Other features, objects and advantages will appear from the following more detailed description of illustrative embodiments of the invention, which will now be given in conjunction with the accompanying drawings.

In the drawings,
FIG. 1 is a schematic diagram of an embodiment of the invention;
FIGS. 2, 3 and 4 are sets of graphs useful in explaining the operation of the invention; and
FIG. 5 is a fragmentary schematic diagram showing a triggering device suitable for use in a system in accordance with the invention and the connection of such device into the system of FIG. 1 in place of the device shown generally at 14.

FIG. 1 shows the armature 10 and field winding 12 of a motor, the speed of which is to be controlled. For purposes of speed control, these parts of the motor are connected into a double bridge circuit comprising a bridge network within a bridge network. A first or outer bridge comprises a pair of triggering devices 14 and 16, which are also rectifiers, and a pair of conventional rectifiers 18 and 20, each of the devices 14, 16, 18 and 20 being disposed in a different arm of the bridge, as shown, with the devices 14 and 16 having their direction of best conductivity pointed toward the bridge corner 22 and with the rectifiers 18 and 20 having their direction of best conductivity pointed away from the bridge corner 24. The remaining bridge corners 26 and 28 of the outer bridge are connected respectively to alternating current supply lines 30 and 32 fed by any suitable alternating current source 34. In one physically constructed embodiment of the invention, a 60 cycle source was employed, although other frequencies are satisfactory.

A second or inner bridge has the bridge corner 22 in common with the outer bridge. One side of the inner bridge, the upper side as shown in the figure, comprises the winding 36 of a potentiometer, the latter having a movable contactor 38 which forms a second corner of the inner bridge. The lower side of the inner bridge comprises the armature 10 in the righthand arm and a balancing resistor 40 in the lefthand arm. The third corner 42 of the inner bridge is at the junction of the armature 10 and the resistor 40. The upper and lower sides of the inner bridge join at the right in the fourth bridge corner 44, which is connected through the field winding 12 to the corner 24 of the outer bridge, in case the motor is series excited.

A pair of magnetic amplifiers, shown generally at 46 and 48, are provided for converting amplitude into time phase and actuating the triggering devices 14 and 16 respectively. The magnetic amplifiers are provided with a common input transformer which has a primary winding 50, a secondary winding 52 for the amplifier 46, and a secondary winding 54 for the amplifier 48. A load circuit for the secondary winding 52 is extended through a gate winding 56, a rectifier 58, a load resistor 60 and a neutral line 62, with a shunt circuit across the resistor 60 through a current limiting resistor 64 to a triggering terminal 66 of the device 14. The symbol 68 means that the winding 56 and associated windings of the amplifier shown under the symbol are coupled together through a saturable magnetic core, preferably one having a substantially rectangular hysteresis loop. A similar load circuit for the secondary winding 54 is extended through a gate winding 70, a rectifier 72, a load resistor 74 and the neutral line 62, with a shunt circuit across the resistor 74 through a current limiting resistor 76 to a triggering terminal 78 of the device 16. The symbol 80 has a similar meaning to the symbol 68 with respect to the gate winding 70 and other windings shown below the symbol 80. The neutral line 62 connects with the bridge corner 22 to complete the triggering circuits for the devices 14 and 16. The primary winding 50 is connected to the supply lines 30 and 32 as shown.

A potentiometer 82 and a rheostat 84 in series form a source of reference voltage for control purposes and may be supplied as shown from a conventional rectifier circuit 86 connected to the supply lines 30 and 32. The movable contactor 88 for the potentiometer winding 82 is connected through a control winding 90 of magnetic amplifier 46 and a control winding 92 of magnetic amplifier 48 in series to the movable contactor 38 of the potentiometer winding 36.

The magnetic amplifier 46 is provided with a biasing winding 94 connected directly to the line 30 and connected from the line 32 through a rheostat 96 and a rectifier 100. Similarly, the magnetic amplifier 48 is provided with a biasing winding 102 connected directly from the line 30 and connected to the line 32 through a rheostat 104 and a rectifier 106. A protective resistor 108 may be connected as shown across the motor field winding 12, and an overvoltage protective device 110 may be connected across the series combination of the armature 10 and the field winding 12.

In the operation of the system shown in FIG. 1, it will first be assumed that the motor is running at the desired speed and that the speed is not varying. Under these conditions, the inner bridge is unbalanced to an extent just sufficient to allow a certain amount of control current to flow through the gate windings 90 and 92, which current controls the magnetic amplifiers to pass current in pulses starting at a certain phase or time in each half cycle of the alternating current supply wave. During each half cycle, the current passed by the magnetic amplifier quickly builds up a triggering voltage, for example about one volt, which triggers the connected device 14 or 16 as the case may be. The triggered device immediately becomes conductive and stays so till the end of the half cycle, at which time it becomes non-conductive and remains so until such time as it is again triggered. The devices 14 and 16 when conductive permit power from the source 34 to pass through the outer bridge as a rectifying bridge so that the power is transmitted into the inner bridge and applied to the armature and field winding of the motor during each conductive period of the triggering devices.

FIG. 2 shows in idealized form the various wave forms which are present when the motor is running at a selected steady speed, as related to the full-wave rectified current which would pass through a full wave rectifier to the motor. Curve 120 shows the reference full-wave rectified current. Cruve 121 represents the form of the output wave impressed upon the load resistor 60 by the magnetic amplifier 46. Curve 122 represents the form of the output wave impressed upon the load resistor 74 by the magnetic amplifier 48. The curves 121 and 122 are of like polarity with reference to the neutral line 62. The voltage across the resistor 60 is impressed between the triggering terminal 66 and the cathode of the device 14 through the bridge corner 22. At a relatively low voltage, such as about one volt in a practical case, the device 14 becomes conductive, starting a gating period 125. The triggering voltage is represented by the horizontal dotted line A in FIGS. 2, 3 and 4. The voltage across the resistor 74 is impressed between the triggering terminal 78 and the cathode of the device 16 through the bridge corner 22. The triggering of the device 16 starts a gating period 126. During the gating period 125, power flows through the device 14, through the inner bridge and the motor, and through the rectifier 20. During the gating period 126 on the other hand, power flows through the device 16, through the inner bridge and motor, and through the rectifier 18. The power so flowing is assumed to be just sufficient to maintain the motor at the desired constant speed under the given conditions. The current wave forms in the devices 14 and 16 are represented in curves 127 and 128 respectively.

It will be noted that as shown in FIG. 1, the rectifier 86 tends to send current through the control windings in the order of winding 90 followed by winding 92. The unbalance of the inner bridge is in the direction that current tends to flow from the bridge corner 38 through the winding 92 and then through the winding 90 to the bridge corner 42, in opposition to the current from the rectifier 86. These opposing currents are proportional respectively to the armature voltage and the reference voltage, so that the inner bridge in effect comprises means for comparing the armature voltage and the reference voltage.

FIG. 3 shows graphically what happens should the motor be suddenly slowed down from the desired speed. The back electromotive force of the motor armature becomes less, thereby altering the degree of unbalance of the inner bridge in such direction to send incerased current through the gating windings 90 and 92 in opposition to the current through these windings from the source of reference voltage. The result is a lessening of the gating flux supplied by the windings 90 and 92, which in turn means that the power applied to the secondary windings 52 and 54 overcomes the gating flux earlier in the cycle than before, thereby firing the magnetic amplifiers earlier in their cycle, as shown curve 130. The corresponding gating periods are lengthened as shown in curve 132, so that the power is applied to the motor over a larger proportion of the cycle, as shown in curve 134, thereby supplying more power to the motor and causing it to increase its speed and thus go back toward the desired constant speed.

FIG. 4 shows graphically what happens should the motor speed up beyond the desired speed. In this case the degree of unbalance of the inner bridge is altered in the direction to send less current through the gating windings 90 and 92 in opposition to the current through these windings from the source of reference voltage. The result now is an increase in the gating flux supplied by the windings 90 and 92, which in turn means that the magnetic amplifiers and the triggering devices fire later in the cycle, thereby cutting down on the power supplied to the motor and causing the motor to reduce its speed and thus again go back toward the desired constant speed. Curves 136, 138 and 140 show respectively the triggering waves, the gating period lengths, and the power supplied to the motor.

The load resistor 60 and the shunt path thereto comprising the protective resistor 64 and the control portion of the triggering device 14 are preferably so proportioned in relative resistance values that only a small proportion of the total current from the magnetic amplifier 46 is allowed to pass through the resistor 60, so that the amount of current so passed through the resistor 60 is a good measure of the current through the control winding 90. As aforementioned, the wave shape across the resistor 60 at a given speed control setting is of the type shown at 121 in FIG. 2.

When it is desired to change the speed of the motor to a different constant speed, the contactor 88 is moved to a different point on the potentiometer winding 82. This will change the total amount of gating current flowing in the gating windings 90 and 92. Moving the contactor 88 upward as shown in FIG. 1 will increase the net gating current, thereby causing increased delay in firing of the magnetic amplifiers, which means that the motor receives less power and will accordingly run slower. Moving the contactor 88 downward will decrease the net gating current with the overall effect that the motor receives more power and will run faster. At any given setting of the contactor 88, the motor will be automatically controlled to run at a particular speed and the contactor 88 may be provided with a calibrated dial to indicate the speed corresponding to each setting, in conventional manner. At any setting, if the motor slows, the power to the motor is automatically increased, and if the motor speeds up, the power to the motor is automatically decreased.

The currents in the biasing windings 94 and 102 may be adjusted by means of the rheostats 96 and 104, respectively, to obtain any desired initial condition of the saturable reactors upon which are superimposed the effects of the control windings 90 and 92 and the gating windings 56 and 70.

The system of FIG. 1 may be calibrated with reference to the speed of the motor in various ways, one of which will now be given. The motor armature may be locked or stalled so that it will not turn, and the power input from source 34 may be reduced to a value which will not cause injury to the motor from short-circuit current. The contactor 88 may then be set to zero on its dial, indicating the position for zero motor speed. As shown in FIG. 1, the zero reading will be where contactor 88 is in its uppermost position. For use in the calibration, an ammeter may be provided in series with the motor armature. With the magnetic amplifiers on, the movable contactor 38 may be moved over the potentiometer winding 36 to such a position that voltage from 38 to 42 becomes zero. This adjustment has been found to be quite critical, but once made, the contactor 38 may be left in the adjusted position and the circuit will remain in adjustment indefinitely thereafter.

The control of the motor speed is found to be effective at any desired speed from zero to full rated speed of the motor.

It is the purpose of the peak voltage limiting device 110 to protect the triggering devices 14 and 16 from severe transient effects arising in the large inductances of the motor field winding and armature which may accompany sudden changes in the mechanical load of the motor requiring sudden changes in the power supplied to the motor. This protection is obtained by shunting the peak voltage limiting device 110 across the field winding 12 and armature 10 as shown. Also, stabilization of the control circuit at the slower speed settings is facilitated by use of the shunt resistor 108 across the field winding 12 as shown.

A suitable triggering device for use as the device 14 or 16 is a latching switch of the type known as a silicon controlled rectifier, comprising four layers of silicon semiconductor material alternately N-type and P-type, with the gating or triggering terminal 66 (or 78) connected to the P-type layer between the two N-type layers. For the same purpose a thyratron may also be used. Such a device of either type has a cathode, an anode and a gating terminal. In the silicon controlled rectifier, the outer N-type layer constitutes the cathode and the outer P-type layer the anode. The cathodes of the devices 14 and 16 are connected to the bridge corner 22 as shown in FIG. 1. The connection of a silicon controlled rectifier into the outer bridge to serve as the triggering device 14 is shown diagrammatically in FIG. 5 where the rectifier is designated 112 and has its anode connected to the bridge corner 26 and its cathode connected to the bridge corner 22. The connection of the gating terminal 66 is also shown in FIG. 5.

In applications of the invention where the armature voltage of the motor does not correspond with sufficient accuracy to the actual speed of the motor, the control signal may be obtained by connecting a tachometer to the motor in known manner and using a voltage generated by the tachometer for comparison with the voltage from the reference source.

While the invention has been illustrated with reference to a series excited motor, it will be evident that it is equally applicable to shunt-excited or compositely excited motors. In any case, the armature of the motor is to be included in one arm of the inner bridge and the armature current is to be passed through the series field winding if one is employed.

While illustrative forms of apparatus and methods in accordance with the invention have been described and shown herein, it will be understood that numerous changes may be made without departing from the general principles and scope of the invention.

What is claimed is:

1. In a motor speed control system, in combination, first and second bridge networks interposed between a source of alternating current and a motor to be controlled, a first said bridge network comprising a full-wave rectifier bridge having one diagonal thereof connected across said source of alternating current, said first bridge network including a triggering device; the second said bridge network having one diagonal thereof connected in the remaining diagonal of the said first bridge network, one arm of said second bridge network having the armature of a motor to be controlled connected therein; a source of reference direct current voltage, means located in the remaining diagonal of said second bridge network for comparing a voltage from said reference source with a voltage derived from the armature of the motor and indicative of the speed of the motor whereby a control voltage is determined, a magnetic amplifier having its input connected to said source of alternating current, means to impress said control voltage upon a control winding of said magnetic amplifier to control the phase at which said magnetic amplifier fires, means connecting the output of said magnetic amplifier to a triggering terminal of said triggering device, whereby the phase at which the said magnetic amplifier fires determines the phase at which the said triggering device is triggered, whereby the phase of firing of the triggering device determines the supply of energy from the source of alternating current through said bridge networks to said motor and the phase of firing of the triggering device is responsive to the speed of the motor to advance or retard the phase as necessary to decrease or increase the supply of energy to the motor to maintain the motor speed substantially constant under varying loads.

2. Apparatus according to claim 1, together with means included in said second bridge network for varying the voltage from the reference source in order to select the particular speed which the motor is required to maintain substantially constant under varying loads.

3. Apparatus according to claim 1, together with means included in said second bridge network for varying the initial degree of unbalance in said second bridge network for controlling an initial adjustment of the system.

4. In a motor speed control system, in combination;
a first rectifier bridge network having input and output terminals;
a second bridge network having input and output terminals;
controlled semiconductor rectifying devices located in adjacent arms of said first rectifier bridge network and being poled so as to conduct towards a first one of said output terminals of said first rectifier bridge network;
means connecting the input terminals of said second bridge network across the output terminals of said first bridge network;
a motor to be controlled for constant speed operation, the armature of said motor being located in one arm of said second rectifier bridge network;
a source of reference voltage;
means to compare a voltage from said source of reference voltage with a voltage derived from the armature of the motor to be controlled, and indicative of the speed of the motor whereby a control voltage is determined;
a magnetic amplifier;
means to impress said control voltage upon a control winding of said magnetic amplifier to control the phase at which the said magnetic amplifier fires;
means connecting a source of alternating current across the input terminals of said first rectifier bridge network and through said controlled semiconductor rectifying devices to the motor for supplying pulsed direct current to the motor;

and means connecting the output of said magnetic amplifier to a gating terminal of said controlled semiconductor rectifying devices whereby the phase at which the said magnetic amplifier fires determines the phase at which the said controlled semiconductor rectifying devices are triggered, whereby the phase of firing of the triggering devices is responsive to the speed of the motor to advance or retard the phase as necessary to decrease or increase the supply of energy to the motor to maintain the motor speed substantially constant under varying loads.

5. In a motor speed control system, in combination;

a first rectifier bridge network having input and output terminals;

a second bridge network having input and output terminals;

controlled semiconductor rectifying devices located in two adjacent arms of said first rectifier bridge network and being poled so as to conduct toward a first one of said output terminals of said first rectifier bridge network;

a motor to be controlled for constant speed operation, the armature of said motor being located in one arm of said second bridge network;

a field winding for said motor;

means connecting a first one of the input terminals of said second bridge network to said first one of said output terminals of said first rectifier bridge network;

means connecting the remaining input terminal of said second bridge network to a first terminal of said field winding;

means connecting a second terminal of said field winding to the second output terminal of said first rectifier bridge network;

a source of reference voltage;

means to compare a voltage from said source of reference voltage with a voltage derived from the armature of the motor to be controlled and indicative of the speed of the motor whereby a control voltage is determined;

a magnetic amplifier;

means to impress said control voltage upon a control winding of said magnetic amplifier to control the phase at which the said magnetic amplifier fires;

means connecting a source of alternating current to the power input of said magnetic amplifier;

means connecting a source of alternating current across the input terminals of said first rectifier bridge network and through said controlled semiconductor rectifying device to the motor for supplying pulsed direct current to the motor;

and means connecting the output of said magnetic amplifier to a gating terminal of said controlled semiconductor rectifying devices whereby the phase at which the said magnetic amplifier fires determines the phase at which the said controlled semiconductor rectifying devices are triggered, whereby the phase of firing of the triggering devices is responsive to the speed of the motor to advance or retard the phase as necessary to increase or decrease the supply of energy to the motor to maintain the motor speed substantially constant under varying loads.

6. Apparatus according to claim 5, together with means included in said second bridge network for varying the voltage from the reference source in order to select the particular speed which the motor is required to maintain substantially constant under varying loads.

7. Apparatus according to claim 5, together with means included in said second bridge network for varying the initial degree of unbalance in said second bridge network for controlling an initial adjustment of the system.

References Cited by the Examiner

UNITED STATES PATENTS

| | | | |
|---|---|---|---|
| 3,024,401 | 3/1962 | Dinger | 318—327 X |
| 3,064,174 | 11/1962 | Dinger | 318—331 X |
| 3,095,534 | 6/1963 | Cockrell | 318—331 X |
| 3,119,957 | 1/1964 | Alexanderson | 318—257 |
| 3,123,757 | 3/1964 | Gaudet | 318—327 |
| 3,127,550 | 3/1964 | Gilbreath | 318—331 |
| 3,181,050 | 4/1965 | Berman | 318—331 |

ORIS L. RADER, *Primary Examiner.*